Figure 1:
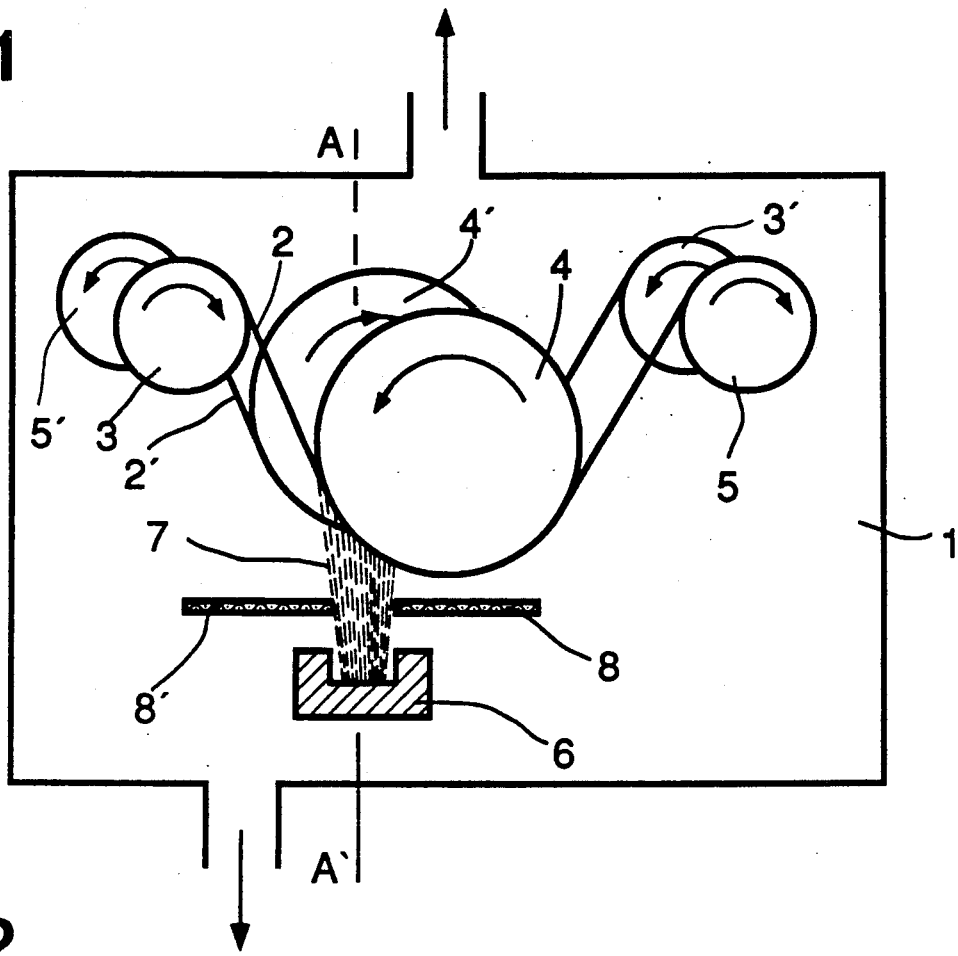

United States Patent [19]
Richter et al.

[11] Patent Number: 5,192,583
[45] Date of Patent: Mar. 9, 1993

[54] PRODUCTION OF A MAGNETIC RECORDING MEDIUM

[75] Inventors: Hans J. Richter, St. Martin; Hartmut Hibst, Schriesheim; Gerd Fischer, Ludwigshafen, all of Fed. Rep. of Germany

[73] Assignee: BASF Magnetics GmbH, Mannheim, Fed. Rep. of Germany

[21] Appl. No.: 866,739

[22] Filed: Apr. 10, 1992

[30] Foreign Application Priority Data

Apr. 12, 1991 [DE] Fed. Rep. of Germany ....... 4112095

[51] Int. Cl.$^5$ ............................................. H01F 10/02
[52] U.S. Cl. .................................... 427/128; 427/132; 427/251; 427/255.5; 427/296
[58] Field of Search ............ 427/128, 132, 251, 255.5, 427/296

Primary Examiner—Bernard Pianalto
Attorney, Agent, or Firm—Keil & Weinkauf

[57] ABSTRACT

A magnetic recording medium, essentially consisting of a polymeric, web-like substrate and a coherent thin layer of a ferromagnetic material, is produced in a chamber under reduced pressure by depositing a vapor jet of the ferromagnetic material onto the moving substrate surface guided over a roller-like cooling element.

1 Claim, 1 Drawing Sheet

PRODUCTION OF A MAGNETIC RECORDING MEDIUM

The present invention relates to a process for the production of a magnetic recording medium, consisting essentially of a polymeric, web-like substrate and a coherent thin layer of a ferromagnetic material in a chamber under reduced pressure by depositing a vapor jet of the ferromagnetic material on the moving substrate surface guided over a cylindrical drum.

Magnetic recording media whose magnetic layer consists of a coherent, thin ferromagnetic metal layer are known. They are usually produced by vaporizing the ferromagnetic material in an evaporator unit in a chamber under reduced pressure and depositing the resulting vapor jet on the moving surface of a polymeric substrate, which surface is guided over a cylindrical drum, usually a roller-like cooling element. To produce a preferred magnetic direction in the magnetic layer, the vapor jet is deposited obliquely to the plane of the substrate. The angular range for vapor deposition can be established by covering parts of the vapor jet by screens. Furthermore, it is also possible to arrange the evaporator source in such a way that it is located vertically beneath the axis of rotation of the cylindrical drum but shifted toward the vertical projection of the generating line of the drum.

Recording media produced in this manner are particularly suitable for recording information with a high storage density, as occurs, for example, at the high frequencies of modern video recording systems. In such video applications, which operate according to the helical scan principle, the head moves at an angle of in general from 3° to 10° relative to the running direction of the tape. Depending on the recording system, moreover, the air gap of the head is additionally inclined at an angle, which, for example in the Hi8 system, may be 10° with respect to the recording direction. Thus the recorded tracks are inclined, for example, by about 15° with respect to the running direction of the tape and hence to the projection of the preferred magnetic direction into the film plane. This deviation from the preferred magnetic direction of the magnetic recording medium means a loss of residual induction available for playback.

It is an object of the present invention to provide a process for the production of magnetic recording media of the thin metal layer type, which process does not have the disadvantage described; in particular, it is an object of the present invention to obtain a magnetic recording medium of the thin metal layer type in which the projection of the preferred magnetic direction into the plane of the tape coincides with the mean recording direction.

We have found that this object is achieved by a process for the production of magnetic recording media, consisting essentially of a polymeric substrate and a coherent thin layer of a ferromagnetic material, in a chamber under reduced pressure by producing a vapor jet of the ferromagnetic material from an evaporator unit provided with said material and depositing the vapor jet on the substrate guided over a cylindrical drum, preferably a roller-like cooling drum, the vapor jet striking the substrate differing from 90°, if, in the chamber under reduced pressure, a vapor jet of ferromagnetic material, emerging from an evaporator unit in the direction of the cylindrical drum, comes into contact at angles of incidence of not less than 30° and not more than 90° with the surfaces of two web-like substrates guided in opposite directions over two separate, cylindrical drums, with the proviso that the evaporator unit is shifted in the axial direction of the drums so that it is located essentially between the two cylindrical drums.

The materials suitable for forming thin ferromagnetic layers are known. These are the metals Co, Ni and Fe applied as thin layers and alloys thereof and thin layers which also contain one or more further elements, e.g. chromium. In particular, the presence of oxygen helps to improve the magnetic, chemical and mechanical properties of these layers, especially if oxygen is added during the vapor deposition process.

Figure 2:
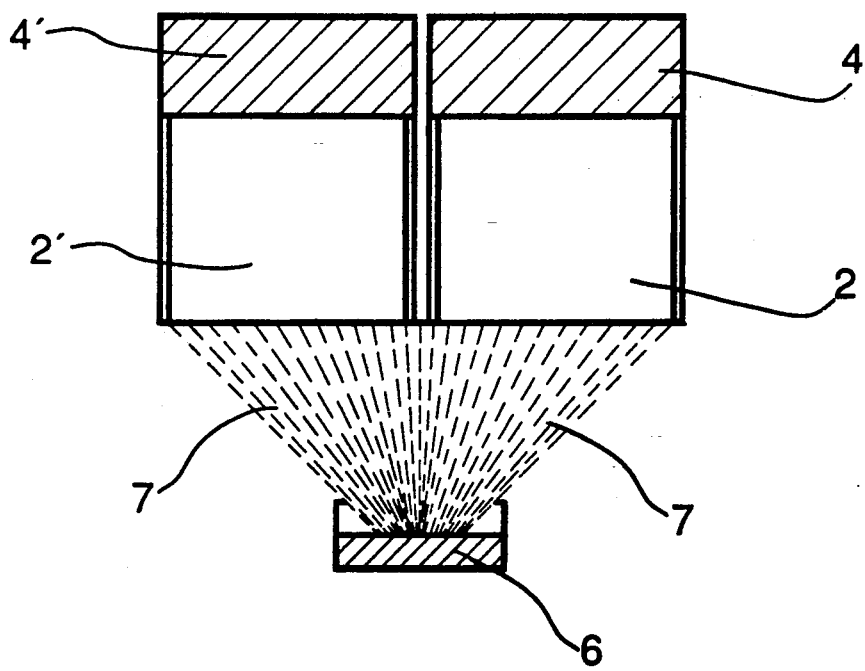

The procedure for the novel process is described by way of example with reference to FIGS. 1 and 2.

FIG. 1 shows a diagram of the vapor deposition means according to the novel process and FIG. 2 shows a side view of the vapor deposition means according to FIG. 1, corresponding to the Section A—A'.

FIG. 1 shows, by way of example, a vapor deposition means suitable for the novel process. Two units for receiving and transporting two separate web-like substrates 2 and 2' are located in the chamber 1 under reduced pressure. The substrate is fed from the storage reels 3 and 3' via the oppositely rotating cylindrical drums 4 and 4' to the rewind reels 5 and 5'. The evaporator unit 6 containing the ferromagnetic material whose vapor jet 7, owing to the screens 8 and 8', strike the substrate webs 2 and 2' at angles of incidence of from not less than 30 to not more than 90° is located below the drums, shifted laterally toward the vertical projection of the generating lines of the cylindrical drums. In the novel process, the evaporator unit 6 is shifted in the axial direction of the cylindrical drums 4 and 4' so that it is located essentially between the two drums. This arrangement of the evaporator unit 6 in relation to the drums 4 and 4' is clearly illustrated by FIG. 2, which shows a section along the line A—A' of FIG. 1. The displacement of the evaporator unit and the screening of the vapor jet, as shown schematically in FIGS. 1 and 2, are chosen so that the mean angle of incidence agrees virtually exactly with the mean recording angle intended for the magnetic recording material.

The novel process makes it possible to produce magnetic recording media, in particular those for video recording by the helical scan principle, whose projection of the preferred magnetic direction into the plane of the tape corresponds to the mean recording direction. In particular, the novel process makes it possible to achieve the advantageous/preferred orientation of the magnetic direction by an economical procedure since, owing to the double coating, only slight screening of the vapor jet is necessary, with the result that better utilization of the vaporized ferromagnetic material is achieved.

We claim:

1. A process for the production of a magnetic recording medium, consisting essentially of a polymeric substrate and a coherent thin layer of a ferromagnetic material, in a chamber under reduced pressure by producing a vapor jet of the ferromagnetic material from an evaporator unit provided with said material and depositing the vapor jet on the substrate guided over a cylindrical drum, the vapor jet striking the substrate at angles differing from 90°, wherein, in the chamber under reduced pressure, a vapor jet of ferromagnetic material, emerging from an evaporator unit in the direction of the cylindrical drum, comes into contact at angles of incidence of not less than 30° and not more than 90° with the surfaces of two web-like substrates guided in opposite directions over two separate, cylindrical drums, with the proviso that the evaporator unit is shifted in the axial direction of the drums so that it is located essentially between the two cylindrical drums.

* * * * *